US012107773B2

(12) United States Patent
Cai et al.

(10) Patent No.: US 12,107,773 B2
(45) Date of Patent: *Oct. 1, 2024

(54) SYSTEM AND METHOD FOR DYNAMIC PHYSICAL RESOURCE BLOCK ALLOCATION ACROSS NETWORKS USING A VIRTUALIZATION LAYER

(71) Applicant: T-MOBILE INNOVATIONS LLC, Overland Park, KS (US)

(72) Inventors: Zheng Cai, Fairfax, VA (US); Zheng Fang, McLean, VA (US); Yu Wang, Fairfax, VA (US); David Zhijun Sun, Broadland, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,910

(22) Filed: Jan. 26, 2023

(65) Prior Publication Data
US 2023/0403241 A1 Dec. 14, 2023

Related U.S. Application Data

(63) Continuation of application No. 17/835,176, filed on Jun. 8, 2022, now Pat. No. 11,601,379.

(51) Int. Cl.
*H04L 47/78* (2022.01)
*H04L 43/16* (2022.01)
*H04L 47/762* (2022.01)
*H04L 47/80* (2022.01)

(52) U.S. Cl.
CPC ............ *H04L 47/781* (2013.01); *H04L 43/16* (2013.01); *H04L 47/762* (2013.01); *H04L 47/801* (2013.01)

(58) Field of Classification Search
CPC ..... H04L 47/781; H04L 43/16; H04L 47/762; H04L 47/801; H04L 41/0896; H04L 41/40; H04L 43/0876
See application file for complete search history.

(56) References Cited

U.S. PATENT DOCUMENTS

| 9,674,859 | B2 | 6/2017 | Sunay et al. | |
| 11,381,475 | B1 | 7/2022 | Katukam et al. | |
| 2015/0074262 | A1* | 3/2015 | Antony | H04L 45/586 |
| | | | | 709/224 |
| 2017/0071008 | A1* | 3/2017 | Sunay | H04W 72/21 |
| 2021/0234648 | A1* | 7/2021 | Parekh | H04W 72/04 |
| 2022/0014963 | A1 | 1/2022 | Yeh et al. | |

* cited by examiner

*Primary Examiner* — Joe Chacko
(74) *Attorney, Agent, or Firm* — Shook, Hardy & Bacon L.L.P.

(57) ABSTRACT

Aspects herein provides a system that utilizes a virtualization layer at a distribution unit or central unit in a network. The virtualization layer includes a plurality of virtual resource blocks that are pooled together as a resource for both a public portion of the network and one or more private portions of the network. Based on loading monitoring of the different portions of the network, the plurality of virtual resource blocks in the pool can be dynamically reallocated between the public and private networks to accommodate and optimize loading. The plurality of virtual resource blocks are mapped to physical resource blocks for scheduling and utilization based on the reallocation.

20 Claims, 5 Drawing Sheets

SYSTEM AND METHOD FOR DYNAMIC PHYSICAL RESOURCE BLOCK ALLOCATION ACROSS NETWORKS USING A VIRTUALIZATION LAYER

CROSS REFERENCE TO RELATED APPLICATION

The present application is a continuation that claims the benefit of and priority to co-pending U.S. application Ser. No. 17/835,176, filed on 8 Jun. 2022 and entitled "System and Method for Dynamic Physical Resource Block Allocation Across Networks Using a Virtualization Layer," the entirety of which is incorporated herein by reference.

TECHNICAL BACKGROUND

The present disclosure generally relates to computer autonomous allocation of physical resource blocks.

BACKGROUND

Existing technologies are limited by their reliance on a fixed partition of the hardware that dictates an allocation of physical resource blocks between multiple networks. In existing technologies, the ratio, percentage, or quantities of physical resource blocks that are allocated to a private network and the ratio, percentage, or quantities of physical resource blocks that are allocated to an operator network is fixed due to this "hard" partitioning in the physical layer.

SUMMARY

A high-level overview of various aspects of the invention are provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media that generates virtualized representations of physical resource blocks within a virtualization layer, enables sharing of the pool of virtualize representations for the actual physical blocks on a dynamic basis and with flexible ratios, and dynamically assigns/reassigns the virtual resource blocks between multiple networks without relying on hard partitioning.

In one aspect, a method is provided. The method generates a virtualization layer on top of the physical layer associated with a plurality of physical resource blocks, the virtualization layer hosting a plurality of virtual physical resource blocks, and the virtualization layer emulating hardware of the physical layer that is associated with the physical resource blocks. A radio intelligence controller monitors loading of a plurality of networks utilizing the plurality of physical resource blocks, in near real-time. When the radio intelligence controller determines that the near real-time loading of one or more of a plurality of networks at least meets a threshold, the radio intelligence controller communicates a reallocation request to the distribution unit. In response to the reallocation request, the distribution unit reallocates one or more of the plurality of virtual physical resource blocks in the virtualization layer from one network in the plurality of networks to another network in the plurality of networks. Then, the one or more of the plurality of virtual physical resource blocks being reallocated are mapped by the distribution unit to one or more of the plurality of physical resource blocks associated with the physical layer. Then, in accordance with the method, the one or more of the plurality of physical resource blocks associated with the physical layer in the second network are utilized, based on the mapping of the one or more of the plurality of virtual physical resource blocks reallocated in the virtualization layer.

In another aspect, one or more non-transitory computer-readable media are provided for storing instructions that when executed via one or more processors performs a computerized method. In such an aspect, a virtualization layer is generated on top of the physical layer associated with a plurality of physical resource blocks, at one or more of a central unit or a distribution unit, the virtualization layer hosting a plurality of virtual physical resource blocks, and the virtualization layer emulating hardware of the physical layer that is associated with the physical resource blocks. In near real-time, a radio intelligence controller monitor loading of a plurality of networks utilizing the plurality of physical resource blocks. When the radio intelligence controller determines that the near real-time loading of one or more of a plurality of networks at least meets a threshold, a reallocation request is communicated to the distribution unit. In response to the reallocation request, the distribution unit reallocates one or more of the plurality of virtual physical resource blocks in the virtualization layer from a first network in the plurality of networks to a second network in the plurality of networks. The one or more of the plurality of virtual physical resource blocks being reallocated is mapped by the distribution unit to one or more of the plurality of physical resource blocks associated with the physical layer. Then, the one or more of the plurality of physical resource blocks associated with the physical layer in the second network are utilized based on the mapping of the one or more of the plurality of virtual physical resource blocks that is reallocated in the virtualization layer.

In yet another aspect, a system is provided. The system includes a distribution unit having a physical layer associated with a plurality of physical resource blocks and a virtualization layer generated on top of the physical layer of the distribution unit. The system further includes a radio intelligence controller and one or more processors. Via the one or more processors, the system generates, at one or more of a central unit or a distribution unit, a virtualization layer on top of the physical layer associated with a plurality of physical resource blocks, the virtualization layer hosting a plurality of virtual physical resource blocks, and the virtualization layer emulating hardware of the physical layer that is associated with the physical resource blocks. The radio intelligence controller monitors, in near real-time, loading of a plurality of networks utilizing the plurality of physical resource blocks. When the radio intelligence controller determines that the near real-time loading of one or more of a plurality of networks at least meets a threshold, a reallocation request is communicated to the distribution unit. In response to the reallocation request, the distribution unit reallocates one or more of the plurality of virtual physical resource blocks in the virtualization layer from a first network in the plurality of networks to a second network in the plurality of networks. Then, the one or more of the plurality of virtual physical resource blocks being reallocated are mapped by the distribution unit to one or more of the plurality of physical resource blocks associated with the physical layer. The system then utilizes the one or more of the plurality of physical resource blocks associated with the physical layer in the second network based on the mapping of the one or more of the plurality of virtual physical resource blocks that is reallocated in the virtualization layer.

BRIEF DESCRIPTION OF THE DRAWINGS

Aspects are described in detail below with reference to the attached drawings figures, wherein.

DETAILED DESCRIPTION

Figure 1:
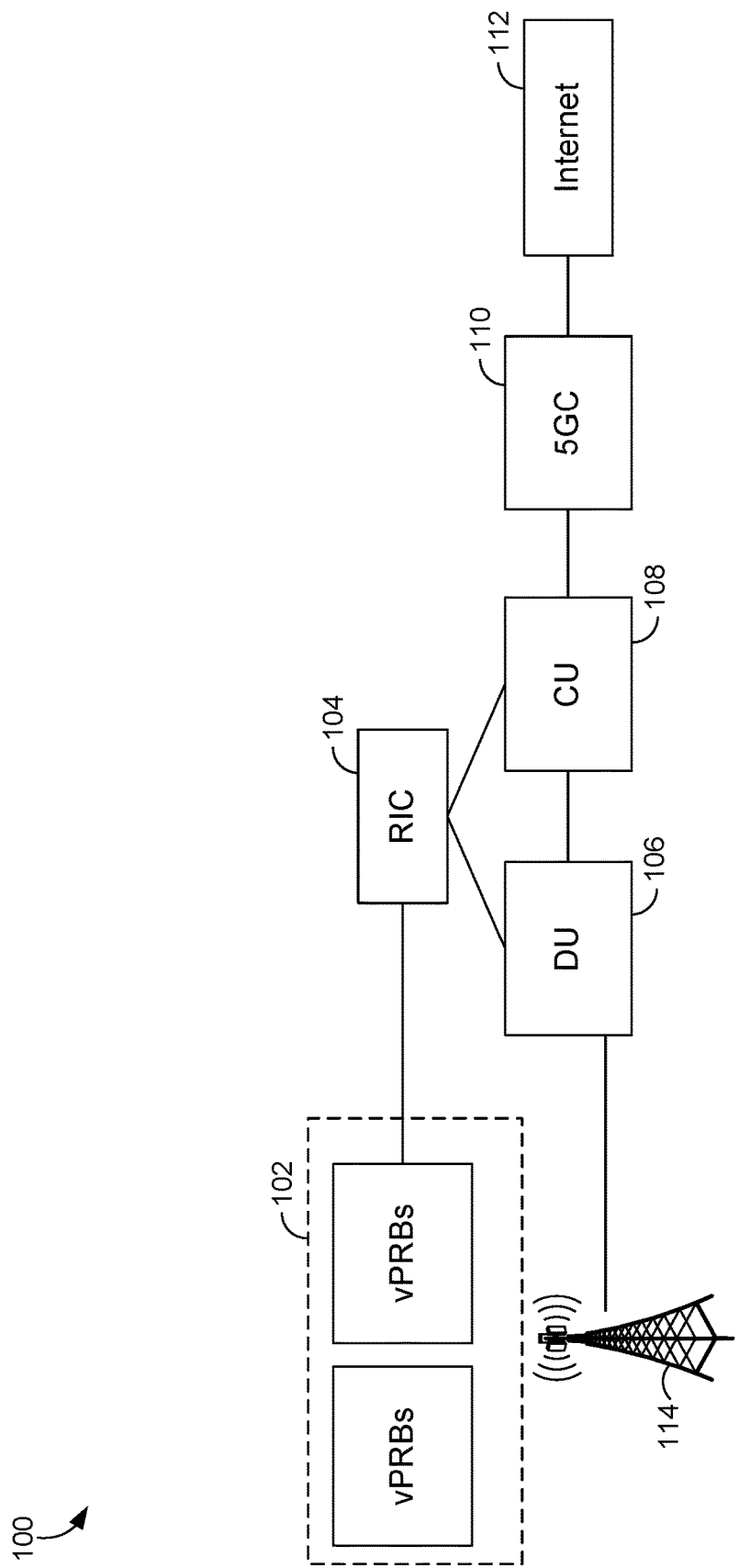
FIG. 1 depicts an example of a system in accordance with one or more embodiments.

The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G Fifth-Generation Wireless Access Technology
5GC Fifth-Generation Wireless Access Technology Core Network
AAU Active Antenna Unit
BRS Broadband Radio Service
CD-ROM Compact Disk Read Only Memory
CDMA Code Division Multiple Access
CU Central unit
DU Distribution unit
EIRP Equivalent Isotropically Radiated Power
eNodeB Evolved Node B
EVDO Evolution-Data Optimized
GIS Geographic/Geographical/Geospatial Information System
gNB Next Generation Node B
gNB CU Next Generation Node B Central Unit
gNB DU Next Generation Node B Distribution Unit
GPRS General Packet Radio Service
GSM Global System for Mobile Communications
iDEN Integrated Digital Enhanced Network
DVD Digital Versatile Disc
EEPROM Electrically Erasable Programmable Read-Only Memory
FD-MIMO Full Dimension Multiple-Input Multiple-Output
IOT Internet of Things
IIOT Industry Internet of Things
LED Light Emitting Diode
LTE Long Term Evolution
MEC Mobile Far Edge Computer
MD Mobile Device
MIMO Multiple-Input Multiple-Output
mMIMO Massive Multiple-Input Multiple-Output
MMU Massive Multiple-Input Multiple-Output Unit
mmWave Millimeter Wave
NEXRAD Next-Generation Radar
NR New Radio
DOBE Out-of-Band-Emission
OTN Optical Transport Network
PC Personal Computer
PCS Personal Communications Service
PDA Personal Digital Assistant
PLMN Public Land Mobile Network
PRB Physical Resource Block
vPRB Virtualized Physical Resource Block
RAN Radio Access Network
RAM Random Access Memory
RET Remote Electrical Tilt
RF Radio-Frequency
RFI Radio-Frequency Interference
RIC Radio Intelligent Controller
RLF Radio Link Failure
R/N Relay Node
RNR Reverse Noise Rise
ROM Read-Only Memory
RRU Remote Radio Unit
RSRP Reference Signal Receive Power
RSRQ Reference Signal Receive Quality
RSSI Received Signal Strength Indicator
RU Radio Unit
SINR Signal-to-Interference-Plus-Noise Ratio
SNR Signal-to-Noise Ratio
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications System
WCD Wireless Communication Device (interchangeable with UE)
WLAN Wireless Local Area Network
XR Extended Reality Further, various technical terms are used throughout this description. An illustrative resource that fleshes out various aspects of these terms can be found in Newton's Telecom Dictionary, 25th Edition (2009).

Embodiments herein may be embodied as, among other things: a method, system, or set of instructions embodied on one or more computer-readable media. Computer-readable media include both volatile and nonvolatile media, removable and non-removable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and non-volatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 500 shown in FIG. 5.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage to one or more UE. For example, the network may include one or more, or a plurality of, wireless networks, hardwired networks, telecommunication networks, peer-to-peer networks, distributed networks, and/or any combination thereof. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments. Examples of a network include a telecommunications network (e.g., 3G, 4G, 5G, CDMA, CDMA 1XA, GPRS, EVDO, TDMA, GSM, LTE, and/or LTE Advanced). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Globalnaya Navigazionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity (SOP)).

"Operator network" refers to a network as discussed above, that is owned and/or controlled by a public carrier entity, such as a Mobile Network Operator (MNO) that owns the radio network spectrum and provides services to client. Generally, the operator network includes the full spectrum allotted for telecommunications. For example, an operator network may refer to a portion of a Public Land Mobile Network that is assigned to the operator entity for usage.

"Private network" refers to a portion with the full spectrum of an operator network that is utilized, under an agreement such as a lease, by a private entity, sometime referred to as a Mobile Virtual Network Operator (MVNO) that has permission to sell access to the MNO's network or a Mobile Virtual Network Aggregator (MVNA) that buys access to the MNO's network. As such, the private network may correspond to a portion of the spectrum owned by the public carrier entity but which is specifically leased for use to the private network to the exclusion of others. For example, a private network may refer to a portion of a Public Land Mobile Network that is assigned to the private entity for usage, while another portion of the same Public Land Mobile Network is assigned to the operator entity for usage.

"Virtualization layer" refers to a layer located above or 'on top' of the physical layer, hosted by one or more of the radio unit(s), the distribution unit(s), or the central unit(s), for example. The virtualization layer is generated using software that specifically emulates the function(s) of the underlying hardware that is located in the physical layer.

"Physical resource block" (PRB) and "actual physical resource block" are used interchangeably to refer to a defined quantity of consecutive subcarriers in a frequency domain that are used for wireless transmission and wireless reception of waveform signals via antenna/antenna elements. In some instances, a physical resource block has a defined quantity of consecutive subcarriers in a frequency domain within one slot in a time domain (e.g., LTE). In other instances, a physical resource block has a defined quantity of consecutive subcarriers in a frequency domain independent of the time domain (e.g., 5G NR). In one example, one resource block has twelve consecutive subcarriers of a frequency domain, where one subcarrier corresponds to one resource element in the resource block. The bandwidth of various physical resource blocks is dependent on the numerology and subcarrier spacing utilized, which corresponds to the frequency bands as defined in kilohertz (kHz) and which determines the cyclic prefix of said block in milliseconds (ms). For example, 5G NR technology supports subcarrier spacing of 15, 30, 60, 120 and 240 kHz while LTE technology supports only one subcarrier spacing of 15 kHz. The physical resource blocks form bandwidth parts (BWP). The physical resource blocks discussed herein are compatible and usable in LTE, LTE-M, 3G, 4G, 5G, IoT, IIoT, NB-IoT, and similar technologies without limitation. For this reason, physical resource blocks are discussed herein in a network agnostic manner as the aspects discussed herein can be implemented within each of the different technology environments.

"Virtualized physical resource block" (vPRB) or "virtual resource block" generally refers to a digital representation a physical resources block, as further discussed herein, held or hosted within a virtualization layer. As such, virtual resource blocks operate or function within the virtualization layer and, via software, the virtual resource blocks emulate the function(s) of the underlying physical resource blocks that are located in the physical layer. In aspects herein, virtual physical resource blocks are located within a virtualization layer that corresponds to the radio unit.

"Base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

"Access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter. Access point refers to a device with complex software that is specifically configured to provide one or more user devices with a connection and/or access to a wireless network using, for example, an antenna, an antenna array, and/or one or more antenna elements. Examples of an access point include a cell tower, a cell site, a base station, a NodeB, an eNodeB, a gNodeB, a macro cell, a micro cell, a femtocell, a picocell, and/or a computing device capable of acting as a wireless "hotspot." The terms "access point," "cell site," "base station," and "cell tower" are used interchangeably for simplicity and thus the terms should not be construed as limiting with regard to one another unless expressly designated as such in this Detailed Description. Examples of a cell site include macro cells such as a cell tower controlled by a gNodeB, as well as small cells, such as a femto cell or pico cell. Accordingly, the scale and coverage area of an access point is not limited to the examples discussed, and any size and shape of coverage area are contemplated to be within the scope of the invention. Because a cell tower and a base stations controlling the cell tower may be remote from one another, or alternatively may be localized to each other, the term access point is not intended to be so limited as to require a cell tower and/or antenna. Generally, an access point, as discussed herein, is intended to refer to any device, whether local or remote to a physical location of a cell tower and/or antenna, having complex software that is specifically configured to provide one or more user devices with a connection and/or access to a wireless network.

"User equipment," "UE," "mobile device," and "wireless communication device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smartphone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Embodiments herein create a virtualization layer at the radio unit, the distribution unit, or the central unit. In embodiments herein, the virtualization layer is specifically managed and controlled by the distribution unit, yet the virtualization layer is located at the radio unit. As such, a plurality of virtualized physical resource blocks are located at or hosted within the virtualization layer at the radio unit, yet the allocation of each of the plurality of virtualized physical resource blocks is controlled by or at the direction of the distribution unit, in various aspects. Additionally, embodiments herein monitor and dynamically modify the ratio, percentage, or quantities of physical resource blocks that are provisionally allocated to a private network and/or to an operator network without any hard partitioning in the physical layer.

FIG. 1 provides a system 100. The system 100 includes a radio unit 102, a radio intelligence controller 104, a distribution unit 106 (also interchangeably referred to as the "distributed unit"), a central unit 108 (also interchangeably referred to as the "centralized" unit), and a telecommunications core network 110 that interface with and connects the system 100 and its components to the internet 112. At the radio unit 102 providing service to a spectrum of a PLMN, one portion of the physical resource blocks may be allocated to a private network while another portion of the physical resource blocks may be allocated to an operator network. Although only two networks are discussed in the examples herein for brevity and simplicity, it will be understood that the radio unit 102 providing service to a spectrum of a PLMN may allocate any quantity of the physical resource blocks between a plurality of private networks and the operator network. Generally, the radio unit 102, the radio intelligence controller 104, the distribution unit 106 (also interchangeably referred to as the "distributed unit"), the central unit 108 (also interchangeably referred to as the "centralized" unit), and the telecommunications core network 110 are associated with, are owned by, and/or are controlled by a MNO.

The radio unit 102 includes software and hardware that convert radio signals received via an antenna into digital signals, which are then communicated to the distribution unit 106. The radio unit 102 can include, for example, one or more radio elements of an antenna or antenna array for transmission and receipt of radio frequency signals, for example, where the antenna is associated with or corresponds to a cell tower or base station. The radio unit 102 can include, for example, converters, power amplifiers, power supplies, bandpass filters, and other components. In one aspect, the radio unit 102 includes Synchronization and Fronthaul Transport components, Lower Physical Layer Baseband Processing components, Digital Front End (DFE) components, and/or RF Front End (RF FE) components, for example, to operate and function with an open RAN (O-RAN). The radio unit 102 includes and/or generates a virtualization layer that is located 'on top' of the physical layer. The virtualization layer hosts a plurality of virtual physical resource blocks. One or more of the virtual physical resource blocks are provisionally available for reallocation in two or more of a plurality of the networks, such as the private network and the operator network.

The radio intelligence controller (RIC) 104 is a software component that is communicatively coupled to one or more of the radio units 102, the distribution unit 106, or the central unit 108, or any combination thereof. The radio intelligence controller 104 controls near real-time and non-real-time operations in the system 100, such as network performance, configurations, life cycle, beam optimization and more, for example.

The distribution unit 106 is associated with and/or supports a physical layer associated with a plurality of physical resource blocks, in aspects. Additionally, the distribution unit 106 can be associated with and/or support a Media Access Control (MAC) layer, a Radio Link Control (RLC) layer, and others. The distribution unit 106 is configured, in aspects herein, to individually and dynamically control the allocation and re-allocation of each of a plurality of virtual physical resource blocks, portions of the virtual physical resource blocks, subsets of virtual physical resource blocks, and/or groupings of virtual physical resource blocks located in the virtualization layer of the radio unit 102 in response to real-time or near real-time load monitoring of various networks.

The central unit 108 provides and/or support one or more layers in the protocol stack that are arranged those layers supported by or associated with the distribution unit 106. The central unit 108 can be associated with and/or support a Packet Data Convergence Protocol (PDCP) layer, a Service Data Adaptation Protocol (SDAP) layer, a Radio Resource Control (RRC) layer, and others, for example.

In aspect, the system 100 utilizes one or more processors and the components discussed above to perform specific operations and functions as further discussed hereinafter.

Figure 2:
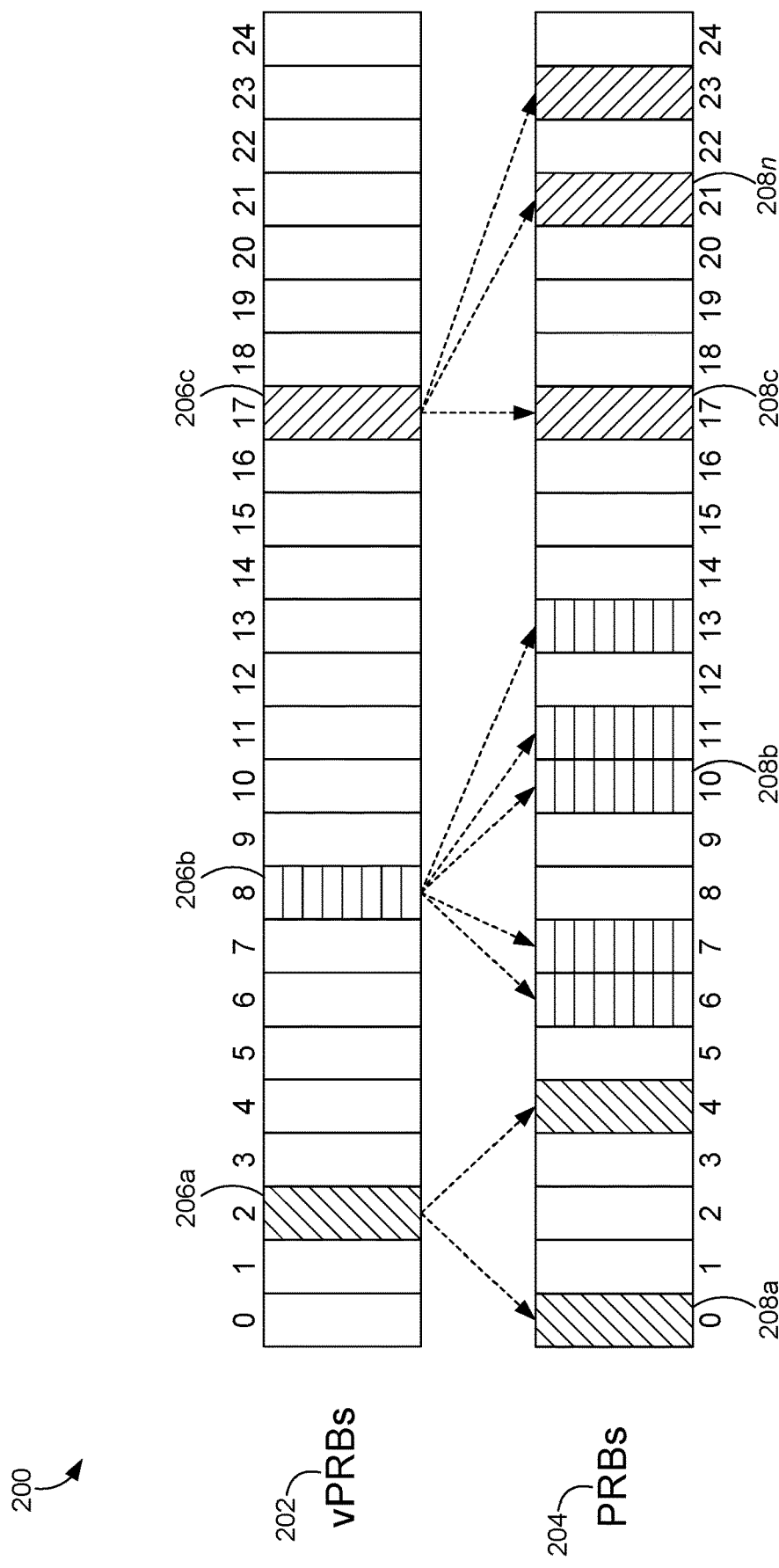
FIG. 2 depicts an example of virtual resource blocks in a virtualization layer that act as a pool being provisionally shared across physical resource blocks in a physical layer, accordance with one or more embodiments.

At the radio unit 102, a virtualization layer is generated on top of the physical layer associated with a plurality of physical resource blocks. The virtualization layer 202 hosts a plurality of virtual physical resource blocks 206A, 206B, and 206C, such that the virtualization layer 202 emulates the hardware of the physical layer 204 that is associated with the physical resource blocks 208A, 208B, 208C, and 208n as shown in the example of FIG. 2. The physical resource blocks are utilized and scheduled to handle radio frequency signal receipt and transmission, via the radio unit 102. The virtual physical resource blocks, however, can be associated with or provisionally allocated to more than one of the private and public networks in embodiments herein. As such, a single virtual physical resource block does not correspond to only one physical resource block that is associated with the public network, but rather a single virtual physical resource block can correspond to both a physical resource block that is associated with the public network and another physical resource block that is associated with a private network, and so on, concurrently. For example, as shown in FIG. 2, virtual physical resource blocks 206A, 206B, and 206C in the virtualization layer 202 are provisionally allocated or available as a pool to multiple of the physical resource blocks 208A, 208B, 208C, and 208n.

Through this technique, the virtual physical resource blocks at the radio unit 102 can be used to provide support for potential allocation for usage that exceeds the actual capacity provided by the physical resource blocks. For example, in a hard petition deployment of other technologies, 30% of the physical resource blocks would be fixedly allocated to private network A, 10% of the physical resource blocks would be fixedly allocated to private network B, and the remaining 60% of the physical resource blocks would be fixedly allocated to the operator network, thus accounting for 100% of the spectrum of the MNO's network. In the technique discussed herein that does not rely on a hard petition, 30% of the physical resource blocks would be provisionally allocated to private network A, 30% of the physical resource blocks would be provisionally allocated to private network B, and the remaining 60% of the physical resource blocks would be provisionally allocated to the operator network, which exceeds the actual limitation of 100% capacity of the spectrum of the MNO's network. As private networks A and B are unlikely or are not predicted to not utilize all of the 30% provisionally allocated at the same time based on historical data for the radio unit 102, the operator can retain 60% of the physical resource blocks, while private networks A and B share the 30% allocation through a pool of virtual resource blocks that both private networks A and B are provisionally allocated. However, this is just one example, and other ratios, percentages, and sharing of the pool between any private or public network 'slice' within the full spectrum of the MNO's network are contemplated to be within the scope of this disclosure.

The radio intelligence controller 104 monitors, in near real-time, loading of a plurality of networks utilizing the plurality of physical resource blocks. The plurality of physical resource blocks may be specific to the radio unit of one cell tower, base station, antenna, or array, in various embodiments. The plurality of networks can include one or more private networks, a public network, or any combination thereof, in embodiments. As such, the radio intelligence controller 104 monitors, in near real-time, loading of each of the private network and the public network, for example. In one example, the radio intelligence controller 104 monitors, in near real-time, loading levels of each of a plurality of private networks and a public network associated with and/or serviced by the radio unit 102. The radio intelligence controller 104 can monitor each private and public network in near real-time to determine whether the loading levels, traffic levels, network performance metrics, or any combination thereof, meet a particular threshold. For example, each of the private network and the public network may be associated with a different corresponding threshold, previously defined for loading. Each network may have multiple thresholds for monitoring, wherein each threshold is customized for a particular distinct parameter, such as loading or traffic, for example. As such, a private network may have a different loading threshold than the public network, in one example. Alternatively, the same threshold(s) may be used for a plurality of networks that are accessible by UE through the radio unit 102. As such, the radio intelligence controller 104 can independently monitor loading of each private network and the public network concurrently or simultaneously, in real-time, by communicating with the radio unit 102. In the manner, the radio intelligence controller 104 monitors the physical resource blocks that are currently utilized by the radio unit 102 for the private network(s) and the public network at that particular geographic location associated with the antenna of the radio unit 102. The threshold can be a minimum or minimum numeric value that is indicative of underutilization of a portion of a band assigned to a particular network in the plurality of networks being monitored, in one example. In another example, the threshold can be a maximum or maximum numeric value that is indicative of overutilization of a portion of a band assigned to the particular network in the plurality of networks being monitored. The threshold could be a percentage (e.g., 75%) of a predefined loading level and/or a maximum loading level. In yet another example, threshold(s) may include a minimum of a maximum along with a flanking buffer range of values around the minimum of a maximum value.

When the radio intelligence controller 104 determines that the near real-time loading of one or more of a plurality of networks at least meets a threshold, the radio intelligence controller 104 generates and communicates a reallocation request to the distribution unit 106. At this time, one or more of the plurality of virtual physical resource blocks in the virtualization layer are provisionally and concurrently allocated (i.e., not in current use) to both the public network and one or more private networks. In other words, the one or more of the plurality of virtual physical resource blocks in the virtualization layer are in a pool that is shared for potential use by the private and public networks.

In response to the reallocation request, the distribution unit 106 reallocates one or more of the plurality of virtual physical resource blocks in the virtualization layer (at the radio unit 102) from one network in the plurality of networks to another network in the plurality of networks. Thus, the distribution unit 106 can manage and control the plurality of virtual physical resource blocks of the radio unit 102. For example, a portion of the plurality of virtual physical resource blocks in the virtualization layer can be dynamically reallocated from a first network in the plurality of networks to a second network in the plurality of networks, or vice versa, at the direction of the distribution unit 106. As such, the virtual physical resource blocks in the virtualization layer can be dynamically swapped from private network to a public network (e.g., from provisional allocation to a MVNA to the MNO), or vice versa (e.g., from provisional allocation to a MNO to the MVNA). When reallocating a virtualized resource block, the virtualized resource block is reconfigured via software to reflect the change for usage in one network slice (e.g., a first network) to another network slice (e.g., a second private network) in the full spectrum of the MNO's network.

In one example, the distribution unit 106 identifies a set of specific virtual physical resource blocks to be reallocated, the set of specific virtual physical resource blocks corresponding to a portion of a band assigned to a private network, and wherein the set is reallocated from usage in one portion of the band assigned to a private network to another portion of the band in a public network. Additionally or alternatively, the distribution unit 106 identifies a set of specific virtual physical resource blocks to reallocate, the set of specific virtual physical resource blocks corresponding to a portion of a band assigned to a public network, and wherein the set is reallocated from usage in one portion of the band assigned to a public network to another portion of the band in a private network, for example.

Figure 3:
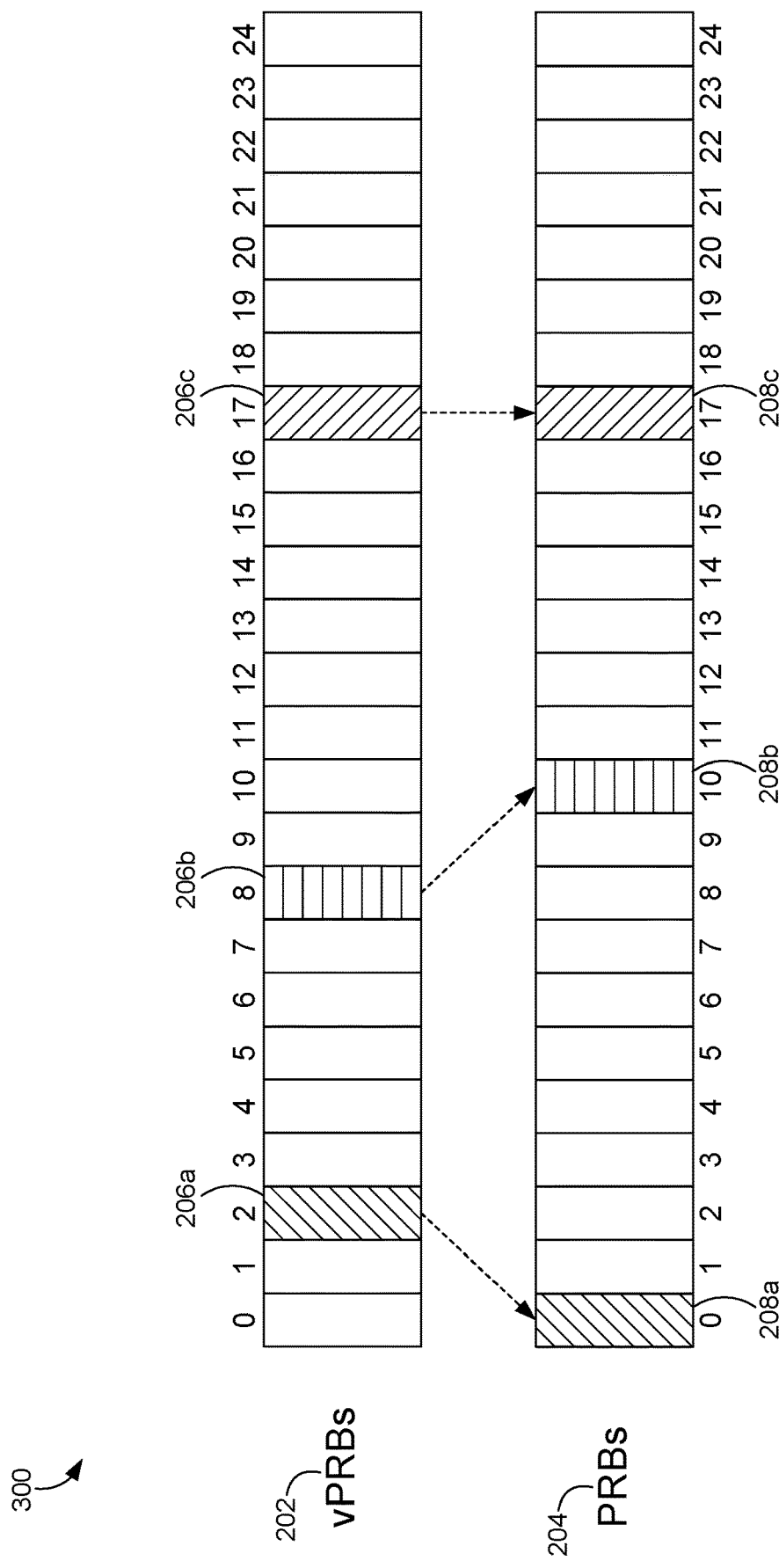
FIG. 3 depicts the virtual resource blocks in the virtualization layer that are mapped to physical resource blocks in a physical layer in accordance with one or more embodiments.

The system 100 then maps the one or more of the plurality of virtual physical resource blocks being reallocated (e.g., as reconfigured via software in the virtualization layer of the radio unit 102) by the distribution unit 106 to one or more of the plurality of physical resource blocks associated with the physical layer. In response to the mapping, the one or more of the virtual physical resource blocks are reallocated to only one network. As such, prior to mapping, a virtual physical resource block can be provisionally allocated across multiple networks, concurrently. Only when the virtual physical resource block is ready to be utilized, is the virtual physical resource block mapped to a physical resource block, thereby becoming allocated to just one network at the moment or timing of actual utilization (i.e., on a 1:1 basis). For example, as shown in FIG. 2, the virtual physical resource blocks 206A, 206B, and 206C in the virtualization layer 202 are provisionally allocated or available as a pool to multiple of the physical resource blocks 208A, 208B, 208C, and 208n, prior to the reallocation and mapping (i.e., each single virtual resource block is available to many physical resource blocks). As shown in FIG. 3, the virtual physical resource blocks 206A, 206B, and 206C in the virtualization layer 202 are then mapped to the physical resource blocks 208A, 208B, and 208C for utilization, such that one virtual resource block is mapped to just one physical resource block. Then, the one or more of the plurality of physical resource blocks associated with the physical layer in the second network are utilized, for example via the radio unit 102, based on the mapping of the one or more of the plurality of virtual physical resource blocks reallocated in the virtualization layer.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing communication links between the components shown in FIG. 1, may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some embodiments may include a plurality of devices and/or components such that FIG. 1 should not be considered as limiting the number of a device or component.

Figure 4:
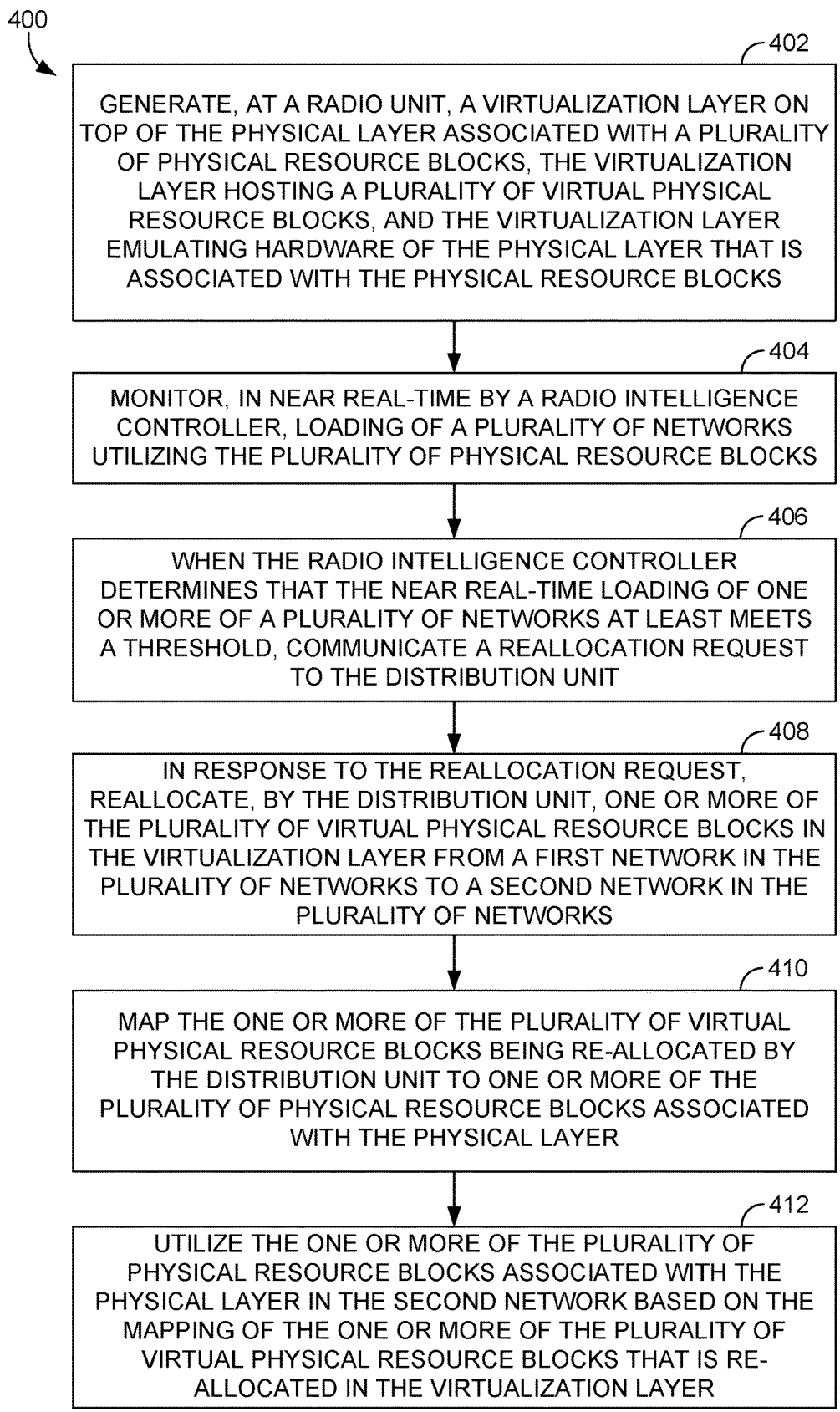
FIG. 4 depicts an example method in accordance with one or more embodiments.

Turning to FIG. 4, a method 400 is provided for establishing a provenance of a media file. In some embodiments, the method 400 can be a computer-implemented method. In one embodiment, one or more non-transitory computer-readable storage media having computer-readable instructions or computer-readable program code portions embodied thereon, for execution via one or more processors, can be used to implement and/or perform the method 400. For example, computer-readable instructions or computer-readable program code portions can specify the performance of the method 400, can specify a sequence of steps of the method 400, and/or can identify particular component(s) of software and/or hardware for performing one or more of the steps of the method 400, in embodiments. As discussed below, the method 400 can be performed using software, hardware, component(s), and/or device(s) depicted in the example of FIG. 1.

At block 402, a virtualization layer is generated on top of the physical layer associated with a plurality of physical resource blocks, the virtualization layer hosting a plurality of virtual physical resource blocks, and the virtualization layer emulating hardware of the physical layer that is associated with the physical resource blocks. In aspects, all, one or more, a portion of, or a subset of the virtual physical resource blocks are provisionally available for reallocation in two or more of the plurality of the networks, concurrently. As such, these virtual physical resource blocks are simultaneously allocated, provisionally (i.e., prior to actual utilizing, mapping, and scheduling), to multiple networks as part of a pool shared among the multiple networks.

At block 404, a radio intelligence controller monitors loading of a plurality of networks, in real-time, that are utilizing the plurality of physical resource blocks. In monitoring, the radio intelligence controller determines those physical resource blocks that are presently being utilized. In this regard, the radio intelligence controller is not monitoring, for example, the virtual physical resource blocks that are not yet mapped, and which are merely provisionally allocated between networks as an available pool. The radio intelligence controller monitors the actual usage of the physical resource blocks to determine load on each of the networks services by a radio unit, for example, wherein the plurality of networks include a private network or a public network. As previously discussed, the one or more private networks and the public network may have the same threshold or different corresponding threshold(s). The threshold may be a minimum indicative of underutilization of a portion of a band assigned to a particular network in the plurality of networks being monitored, or the threshold may be a maximum indicative of overutilization of a portion of a band assigned to the particular network in the plurality of networks being monitored, in various aspects.

At block 406, when the radio intelligence controller determines that the near real-time loading of one or more of a plurality of networks at least meets a threshold, the radio intelligence controller communicates a reallocation request to the distribution unit. At block 408, in response to the reallocation request, the distribution unit reallocates one or more of the plurality of virtual physical resource blocks in the virtualization layer from one network in the plurality of networks to another network in the plurality of networks. For example, one or more of the plurality of virtual physical resource blocks that is provisionally allocated or available in the sharing pool for multiple network can now be reallocated to another particular network. In some aspects, the radio intelligence controller identifies a set of specific virtual physical resource blocks to reallocate, the set of specific virtual physical resource blocks corresponding to a portion of a band assigned to a private network, wherein the set is reallocated from usage in one portion of the band assigned to a private network to another portion of the band in a public network. Additionally or alternatively, the radio intelligence controller identifies a set of specific virtual physical resource blocks to reallocate, the set of specific virtual physical resource blocks corresponding to a portion of a band assigned to a public network, wherein the set is reallocated from usage in one portion of the band assigned to a public network to another portion of the band in a private network. In this manner, the distribution unit directs and controls the reallocation of the virtual physical resource blocks that are hosted in the virtualization layer of the corresponding radio unit.

At block 410, the one or more of the plurality of virtual physical resource blocks being reallocated by the distribution unit are mapped to one or more of the plurality of physical resource blocks associated with the physical layer. In response to the mapping, the one or more of the virtual physical resource blocks are reallocated to only one network of the plurality of networks. As such, these reallocated virtual physical resource blocks transition from being provisionally allocated and available in the pool to multiple networks, to becoming mapped and allocated for actual usage by one network. In one example, each of the one or more of the virtual physical resource blocks that was provisionally available in the sharing pool is mapped, using a one-to-one ratio, to the one or more of the plurality of physical resource blocks, the one or more of the plurality of physical resource blocks being associated with the one network. At block 412, the one or more of the plurality of physical resource blocks associated with the physical layer are utilized in the second network, based on the mapping of the one or more of the plurality of virtual physical resource blocks that is reallocated in the virtualization layer.

Figure 5:
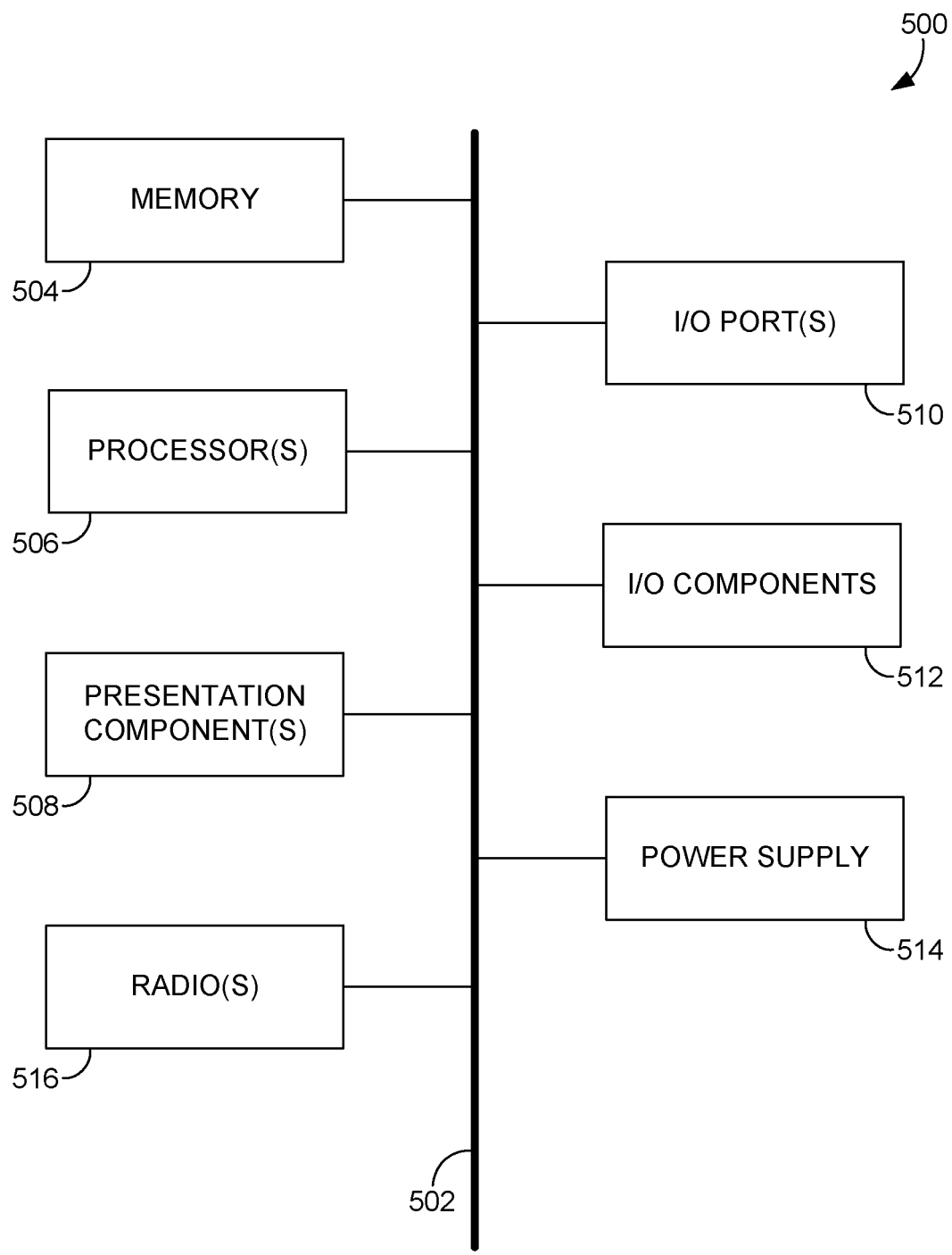
FIG. 5 illustrates an example computing device suitable for use in implementations of the present disclosure.

Turning now to FIG. 5, a diagram is depicted of an example computing device suitable for use in implementations of the present disclosure. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. Distinction is not made between such categories as "workstation," "server," "laptop," "handheld device," etc., as all are contemplated within the scope of FIG. 8 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, non-removable, or a combination thereof. Examples of memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Examples of one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:
monitoring loading of a plurality of networks utilizing a plurality of physical resource blocks to determine when loading of one or more of the plurality of networks at least meets a threshold;
identifying a set of virtual physical resource blocks in a plurality of virtual physical resource blocks, the set corresponding to a portion of a band assigned to a network in the plurality of networks;
reallocating the set of virtual physical resource blocks in a virtualization layer from the portion of the band assigned to the network to another portion of the band in another network in the plurality of networks when the loading of the one or more of the plurality of networks at least meets the threshold; and
utilizing the one or more of the plurality of physical resource blocks based on a mapping of the set of the virtual physical resource blocks that is reallocated.

2. The method of claim 1, wherein monitoring loading of the plurality of networks utilizing the plurality of physical resource blocks includes monitoring loading of each of a private network and a public network in the plurality of networks.

3. The method of claim 1, wherein the network is a private network and the other network is a public network.

4. The method of claim 1, wherein the network is a public network and the other network is a private network.

5. The method of claim 1, wherein the threshold is a minimum indicative of underutilization of a portion of the band assigned to a particular network in the plurality of networks being monitored; or wherein the threshold is a maximum indicative of overutilization of the portion of a band assigned to the particular network in the plurality of networks being monitored.

6. The method of claim 1, wherein the virtualization layer hosts the plurality of virtual physical resource blocks, wherein the one or more of the plurality of virtual physical resource blocks is provisionally available for reallocation in two or more of the plurality of networks.

7. The method of claim 6, wherein each of the one or more of the plurality of virtual physical resource blocks provisionally available is mapped, using a one-to-one ratio, to the one or more of the plurality of physical resource blocks.

8. One or more non-transitory computer-readable media storing instructions that when executed via one or more processors performs a computerized method, the media comprising:
monitoring loading of a plurality of networks utilizing a plurality of physical resource blocks to determine when loading of one or more of the plurality of networks at least meets a threshold;
identifying a set of virtual physical resource blocks in a plurality of virtual physical resource blocks, the set corresponding to a portion of a band assigned to a network in the plurality of networks;
reallocating the set of virtual physical resource blocks in a virtualization layer from the portion of the band assigned to the network to another portion of the band in another network in the plurality of networks when the loading of the one or more of the plurality of networks at least meets the threshold; and
utilizing the one or more of the plurality of physical resource blocks based on a mapping of the set of the virtual physical resource blocks that is reallocated.

9. The media of claim 8, wherein monitoring loading of the plurality of networks utilizing the plurality of physical resource blocks includes monitoring loading of each of a private network and a public network in the plurality of networks.

10. The media of claim 8, wherein the network is a private network and the other network is a public network.

11. The media of claim 8, wherein the network is a public network and the other network is a private network.

12. The media of claim 8, wherein the threshold is a minimum indicative of underutilization of a portion of the band assigned to a particular network in the plurality of networks being monitored; or wherein the threshold is a maximum indicative of overutilization of the portion of a band assigned to the particular network in the plurality of networks being monitored.

13. The media of claim 8, wherein the virtualization layer hosts the plurality of virtual physical resource blocks, wherein the one or more of the virtual physical resource blocks is provisionally available for reallocation in two or more of the plurality of networks.

14. The media of claim 13, wherein each of the one or more of the virtual physical resource blocks provisionally available is mapped, using a one-to-one ratio, to the one or more of the plurality of physical resource blocks.

15. A system comprising:
a radio intelligence controller; and
one or more processors configured to:
monitor loading of a plurality of networks utilizing a plurality of physical resource blocks to determine when loading of one or more of the plurality of networks at least meets a threshold;
identify a set of virtual physical resource blocks in a plurality of virtual physical resource blocks, the set corresponding to a portion of a band assigned to a network in the plurality of networks;
reallocate the set of virtual physical resource blocks in a virtualization layer from the portion of the band assigned to the network to another portion of the band in another network in the plurality of networks when the loading of the one or more of the plurality of networks at least meets the threshold; and
utilize the one or more of the plurality of physical resource blocks based on a mapping of the set of the virtual physical resource blocks that is reallocated.

16. The system of claim 15, wherein the one or more processors are configured to further monitor loading of each of a private network and a public network in the plurality of networks.

17. The system of claim 15, wherein the network is a private network and the other network is a public network.

18. The system of claim 15, wherein the network is a public network and the other network is a private network.

19. The system of claim 15, wherein the threshold is a minimum indicative of underutilization of a portion of a band assigned to a particular network in the plurality of networks being monitored; or wherein the threshold is a maximum indicative of overutilization of a portion of a band assigned to the particular network in the plurality of networks being monitored.

20. The system of claim 15, wherein the virtualization layer hosts the plurality of virtual physical resource blocks, wherein the one or more of the plurality of virtual physical resource blocks is provisionally available for reallocation in two or more of the plurality of networks.

* * * * *